United States Patent
Chuang

(10) Patent No.: US 8,736,937 B2
(45) Date of Patent: May 27, 2014

(54) PIXEL STRUCTURE FOR USE IN A DISPLAY AND DISPLAY USING THE SAME

(75) Inventor: Kai-Cheng Chuang, Tainan (TW)

(73) Assignee: E Ink Holdings Inc., Hsinchu County (TW)

( * ) Notice: Subject to any disclaimer, the term of this patent is extended or adjusted under 35 U.S.C. 154(b) by 687 days.

(21) Appl. No.: 12/274,948

(22) Filed: Nov. 20, 2008

(65) Prior Publication Data

US 2010/0053514 A1   Mar. 4, 2010

(30) Foreign Application Priority Data

Aug. 29, 2008  (TW) ................................ 97133054 A

(51) Int. Cl.
  *G02B 26/02* (2006.01)
  *G02B 26/00* (2006.01)
  *G09G 3/34* (2006.01)
(52) U.S. Cl.
  USPC ............. 359/228; 359/291; 359/296; 345/84; 345/108
(58) Field of Classification Search
  USPC ............ 359/228, 227, 290, 291, 296; 345/84, 345/108, 109
  See application file for complete search history.

(56) References Cited

U.S. PATENT DOCUMENTS

| | | | | |
|---|---|---|---|---|
| 7,163,612 B2* | 1/2007 | Sterling et al. | ................ | 204/600 |
| 7,315,411 B2 | 1/2008 | Moon | | |
| 7,623,205 B2* | 11/2009 | Kim | ............................. | 349/114 |
| 7,667,784 B2* | 2/2010 | Kim et al. | ...................... | 349/44 |
| 7,813,030 B2* | 10/2010 | Lo et al. | ......................... | 359/295 |
| 7,847,996 B2* | 12/2010 | Chen et al. | .................... | 359/228 |
| 7,872,790 B2* | 1/2011 | Steckl et al. | .................. | 359/253 |
| 8,031,168 B2* | 10/2011 | Feenstra et al. | ............... | 345/107 |
| 2003/0123017 A1* | 7/2003 | Kim et al. | ..................... | 349/153 |
| 2003/0164295 A1 | 9/2003 | Sterling | | |
| 2004/0135944 A1* | 7/2004 | Kim | ............................. | 349/113 |
| 2005/0151709 A1 | 7/2005 | Jacobson et al. | | |
| 2006/0221068 A1* | 10/2006 | Feenstra et al. | ............... | 345/204 |
| 2006/0285067 A1 | 12/2006 | Kim | | |
| 2007/0153171 A1* | 7/2007 | Kim | ............................. | 349/114 |
| 2007/0188676 A1 | 8/2007 | Choi et al. | | |
| 2008/0218444 A1* | 9/2008 | Rosser | ............................ | 345/60 |
| 2009/0027317 A1* | 1/2009 | Cheng et al. | .................... | 345/84 |
| 2009/0103159 A1* | 4/2009 | Cheng et al. | .................. | 359/228 |
| 2009/0141334 A1* | 6/2009 | Dean et al. | .................... | 359/290 |

* cited by examiner

*Primary Examiner* — Lucy Chien
*Assistant Examiner* — Paisley L Arendt
(74) *Attorney, Agent, or Firm* — Patterson Thuente Pedersen, P.A.

(57) ABSTRACT

A pixel structure for a display device is provided. The pixel structure utilizes light entering from the ambient environment of the display as a light source. The pixel structure comprises a first substrate, a light obstructing layer, an active element and an adjustable light shielding layer. The light obstructing layer is disposed on the first substrate and has a transparent area and an opaque area. The active element is disposed on the opaque area of the light obstructing layer and has a first state and a second state. The adjustable light shielding layer is disposed on the light obstructing layer and the active element. When the active element is in the first state, the adjustable light shielding layer is adapted to cover the transparent area to shield the light from emitting out from the first substrate. When the active element is in the second state, the adjustable light shielding layer is driven to uncover the transparent area so that the light is adapted to emit out from the transparent area and the first substrate.

17 Claims, 4 Drawing Sheets

PIXEL STRUCTURE FOR USE IN A DISPLAY AND DISPLAY USING THE SAME

This application claims priority to Taiwan Patent Application No. 097133054 filed on Aug. 29, 2008.

CROSS-REFERENCES TO RELATED APPLICATIONS

Not applicable.

BACKGROUND OF THE INVENTION

1. Field of the Invention

The present invention relates to a display device, and more particularly, to a pixel structure for use in an electrowetting display device, an electrowetting display device comprising such a pixel structure.

2. Descriptions of the Related Art

With the rapid advancement of science and technology, various convenient and portable electronic devices, such as mobile phones, personal digital assistants (PDAs), digital cameras, digital video cameras or the like, are becoming increasingly diversified in terms of specifications and functionalities. Specifically, the continuous development of display technologies for portable electronic devices has catered to the various needs of consumers.

Because portable electronic devices are required to have a small volume and light weight to provide good portability, such devices must also conserve power to prolong the endurance of batteries, thereby obviating inconveniences associated with frequent battery recharging. As an effective technology of reducing power consumption of portable electronic devices, a reflective display employs light from an ambient environment as a light source and reflects the light with a reflective sheet located beneath a display panel. Because such a display does not rely on self-illumination, there is no need of a backlight source and a backlight panel. As a result, both the power consumption and weight of the device are reduced. Moreover, the decreased thickness and simpler structure allows the device to be manufactured more easily and at a lower cost, thereby reducing the price of the product for consumers.

Among the display devices that employ external light sources, the electrowetting display, devices demonstrate satisfactory optical characteristics. The electrowetting display devices not only feature a light weight and thin profile, but also allow for a very fast switching operation of the pixel. As a result, movies can be played more smoothly. Therefore, the electro-wetting display devices are highly desired.

FIGS. 1a and 1b are schematic views of a pixel structure 1 of a conventional reflective electrowetting display device. The pixel structure 1 has an opaque substrate 11 adapted to reflect light entering the pixel structure 1 from an ambient environment as the light source of the display device. A reflective electrode layer 12 is formed on the substrate 11 and a transparent electrode layer 14 is formed above the substrate 11 and the reflective electrode layer 12. The reflective electrode layer 12 is controlled by a thin film transistor (not shown) and further has a hydrophobic layer 13 formed thereon. A metallic reflective material (e.g., aluminum or aluminum alloy) is coated on either the upper or lower surface of the reflective electrode layer 12 to reflect the ambient light. An opaque non-polar liquid 15 and a transparent polar liquid 16 are contained between the transparent electrode layer 14 and the hydrophobic layer 13. The hydrophobic layer 13 is formed from a transparent insulation material. The non-polar liquid 15 is typically an oil-based ink, while the polar liquid 16 is typically water. The hydrophobic layer 13 is typically formed of a material selected from the teflon series.

As shown in FIG. 1a, when no voltage is applied across the two electrodes, the attractive force of the hydrophobic layer 13 to the polar liquid 16 is small compared to the surface tension of the polar liquid 16, so it is difficult for the polar liquid 16 to be adsorbed thereon. In contrast, the hydrophobic layer 13 exhibits more affinity to the non-polar liquid 15, which makes it possible for the non-polar liquid 15 to be dispersed throughout the hydrophobic layer 13. Accordingly, when light enters the pixel structure 1, it will be partially or entirely absorbed by the dispersed non-polar liquid 15 to present the color of the non-polar liquid 15.

As shown in FIG. 1b, when a voltage is applied across the two electrodes, a change in the dielectric characteristics and surface characteristics occurs to the hydrophobic layer 13 under the influence of the resulting electric field between the two electrodes, causing the hydrophobic layer 13 to exhibit more affinity to the polar liquid 16 instead. As a result, when a voltage is applied, the polar liquid 16 expels the non-polar liquid 15 to the sides of the pixel due to the attraction of the hydrophobic layer 13, of which the surface energy is changed. As a result, the pixel structure 1 presents the color of the substrate 11.

In a practical display device, a white substrate 1 may be used and a multiplicity of pixels using inks of different colors may be combined. By using electrodes to control the respective pixels, the ink can be dispersed throughout, or contracted to a corner of, the respective pixels to yield a visual effect like a printed colorful paper. Such an electrowetting-based display exhibits superior performance, and switches between the reflections of the white color and other colors at a speed which is sufficiently fast for movie playing. Furthermore, such a display saves considerable power and is made to be very flat and thin.

However, because the ink layer in the electrowetting display of such a structure is not completely transparent, the light of a color similar to the ink will still appear above the ink when the ink is contracted to a corner of the pixel, causing degradation in the contrast ratio demonstrated by the pixel when switched between different switching states. In reference to FIG. 1c, a black matrix 17 is additionally formed on the transparent electrode layer 14 in the conventional pixel structure 1 in such a way that the black matrix 17 is positioned and sized to completely shield the contracted ink, thereby improving the contrast ratio of the display device. However, because the transparent electrode layer 14 is formed on the counter substrate opposite the substrate 11, precise alignment and package of the substrate 11 and the counter substrate with the transparent electrode layer 14 and the additional black matrix 17 is necessary. Moreover, when the reflective electrode layer 12 is coated with a reflective material on the upper or lower surface thereof, an additional patterning process must be performed using an appropriate photomask to have the reflective material patterned according to the locations of the TFTs, which would add to the complexity and cost of the manufacturing process.

In view of this, it is highly desirable in the art to provide a pixel structure for use in an electrowetting display that provides an improved contrast ratio of pixels as well as decreased manufacturing difficulty and costs.

SUMMARY OF THE INVENTION

One objective of this invention is to provide a pixel structure for use in a display device, which employs electrowetting display technology and has a black matrix and other main elements disposed together on a substrate of the light exiting side. The pixel structure of this invention exhibits a high contrast ratio and is easy to fabricate because of the simplified manufacturing process.

Another objective of this invention is to provide a display device, which employs the electrowetting technology and is formed with a black matrix. This provides the display device with a high contrast ratio and simple structure.

This invention discloses a pixel structure and a display device comprising a plurality of such pixel structures. The pixel structure of this invention utilizes a light entering from an ambient environment outside a display as the light source. The pixel structure comprises a first substrate, a light obstructing layer, an active layer and an adjustable light shielding layer. The light obstructing layer is disposed on the first substrate and has a transparent area and an opaque area. The active element is disposed on the opaque area of the light obstructing layer and has a first state and a second state. The adjustable light shielding layer is disposed on the light obstructing layer and the active element. When the active element is in the first state, the adjustable light shielding layer is adapted to cover the transparent area to shield the light from emitting out from the first substrate. When the active element is in the second state, the adjustable light shielding layer is driven to uncover the transparent area so that the light is adapted to emit out from the transparent area and the first substrate.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
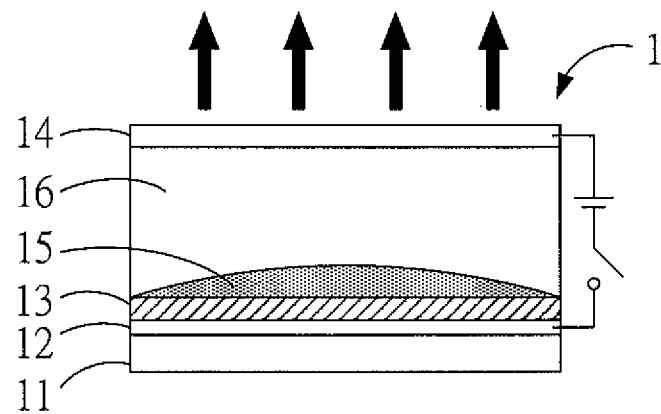
FIG. 1a is a schematic view of a conventional pixel structure when applied with no voltage.
Figure 1B:
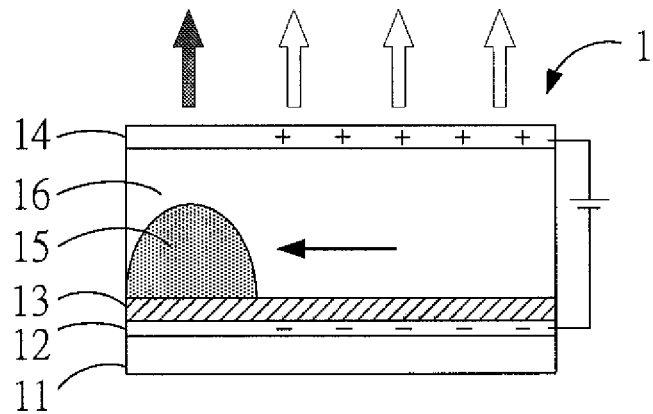
FIG. 1b is a schematic view of the conventional pixel structure when applied with a voltage.
Figure 1C:
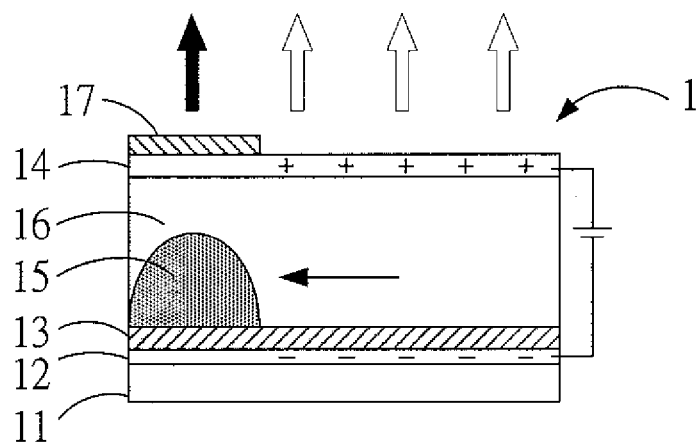
FIG. 1c is a schematic view of a conventional pixel structure with a black matrix.
Figure 2:
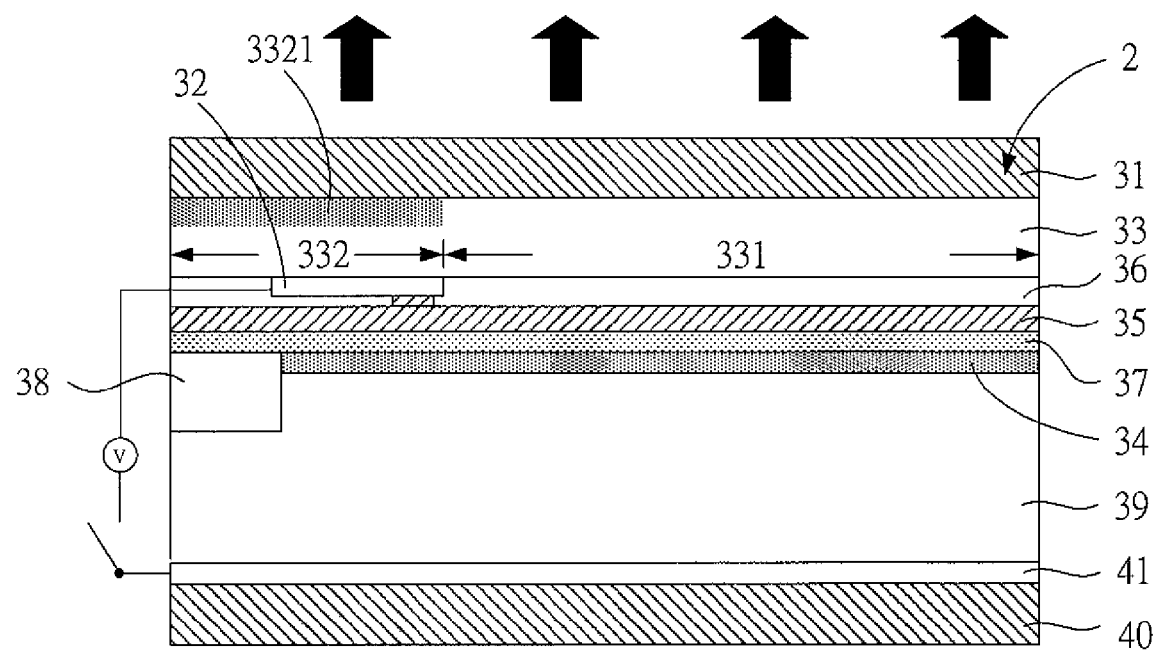
FIG. 2 is a schematic view of a pixel structure according to an embodiment of this invention when applied with no voltage.
Figure 3:
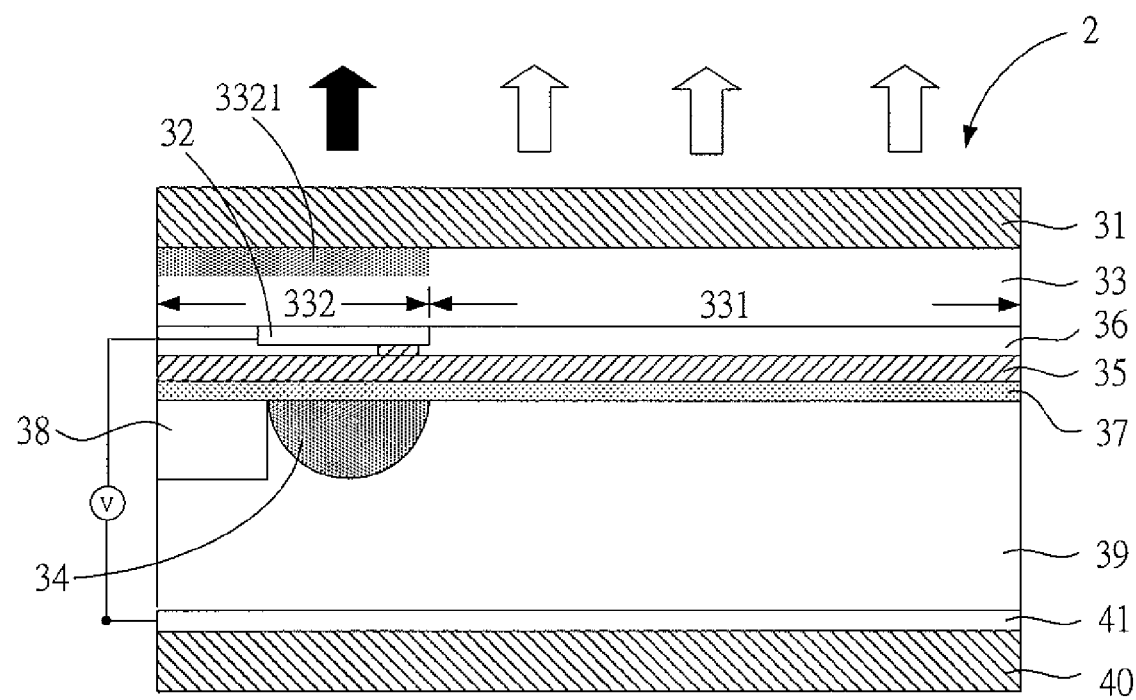
FIG. 3 is a schematic view of the pixel structure according to the embodiment of this invention when applied with a voltage.
Figure 4:
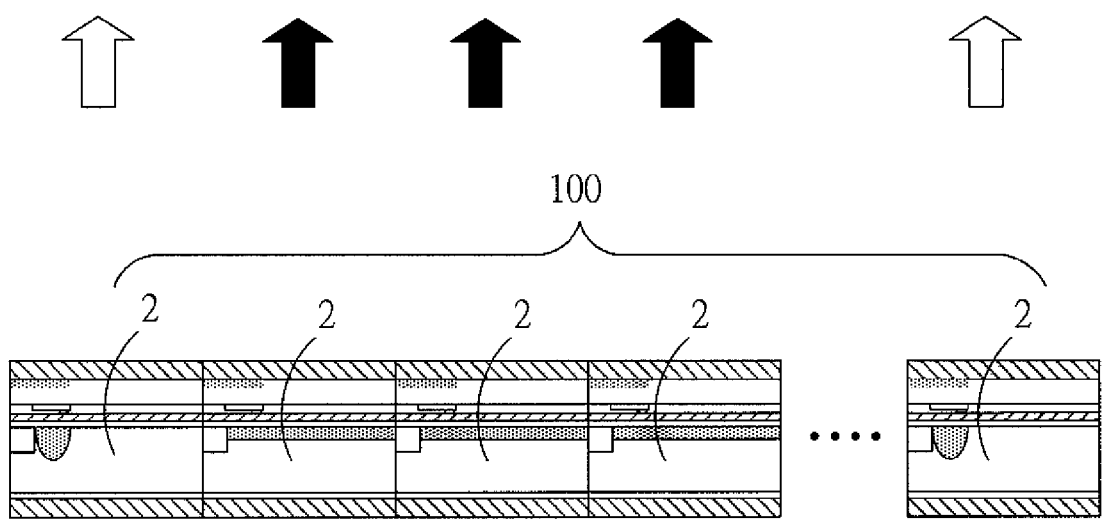
FIG. 4 is a schematic view of a display device of this invention.

This invention discloses a pixel structure 2 and a display device 100 comprising a plurality of such pixel structures 2. The pixel structure 2 is depicted in FIGS. 2 and 3, while the display device 100 is depicted in FIG. 4. FIG. 2 depicts the pixel structure of this invention when applied with no voltage, and FIG. 3 depicts the pixel structure of this invention when applied with a voltage. The pixel structure 2 comprises a first substrate 31 and a second substrate 40. The first substrate 31 is a transparent substrate to serve as a light exiting surface of the pixel structure 2, while the second substrate 40 is an opaque substrate disposed opposite the first substrate 31. A light obstructing layer 33 is disposed on the first substrate 31 and defines a transparent area 331 (the white area in the light obstructing layer 33 as shown in the figures) and an opaque area 332 (the grey area in the light obstructing layer 33 as shown in the figures). The opaque area 332 comprises a black matrix 3321 adapted to block light from entering or exiting the pixel structure 2 through the opaque area 332. Additionally, the opaque area 331 may be formed of a transparent insulation material such as silicon oxide.

An active element 32, which is a thin film transistor (TFT), has a first state and a second state which respectively represents the ON state and OFF state for the pixel control. The active element 32 is disposed on the opaque area 332 of the light obstructing layer 33 and electrically connected to the electrode layer 35. The electrode layer 35 is a transparent conductive layer which may be made of a material selected from Indium Tin Oxide (ITO) or other transparent conductive materials. The pixel structure 2 further comprises a passive layer 36 disposed on the active element 32 and the light obstructing layer 33 to space the active element 32 and the electrode layer 35 apart from each other.

The electrode layer 35 has a hydrophobic layer 37 disposed thereon, which is made of a transparent dielectric. A non-polar liquid and a polar liquid layer 39 are interposed between the hydrophobic layer 37 and the second substrate 40 of the pixel structure 2. The non-polar liquid forms an adjustable light shielding layer 34, which is adapted to spread out on and cover the electrode layer 35 and at least over the area above the active element 32 and the light obstructing layer 33. The non-polar liquid is made of a colored or black opaque ink, while the polar liquid layer 39 is formed from a transparent liquid such as water or a mixture of water, alcohol and salt, although they are not limited thereto. On the other hand, a grid 38 is further disposed on the hydrophobic layer 37 to space the adjustable light shielding layers 34 of different pixel structures apart from each other.

A reflective layer 41 is disposed on the second substrate 40, which is adapted to reflect light entering from outside of the display device so that the light can emit out through the transparent area 331 and the first substrate 31. The reflective layer 41 is made of aluminum or an aluminum alloy and electrically connected to the active element 32.

As shown in FIG. 2, the active element 32 is in the first state (i.e., the switching OFF state) where the active element 32 applies no voltage to the electrode layer 35 and, accordingly, no electric field exists between the electrode layer 35 and the reflective layer 41. In this case, the hydrophobic layer 37 exhibits better affinity to the non-polar liquid than to the polar liquid layer 39, so that the non-polar liquid repels the polar liquid layer 39 to form an adjustable light shielding layer 34 that covers flatly on both the hydrophobic layer 37 and the transparent area 331 and spaces the hydrophobic layer 37 and the polar liquid layer 39 apart from each other. Hence, when light from an ambient environment enters the pixel structure 2 through the transparent area 331, portions of light at different colored frequencies in the adjustable light shielding layer 34 will be absorbed by the adjustable light shielding layer 34, while those with frequencies of the same color as the adjustable light shielding layer 34 will emit out of the adjustable shielding layer 34. Consequently, the pixel structure 2 presents the color of the adjustable shielding layer 34. For example, if the adjustable shielding layer 34 is a red ink, only red light will be reflected out of the pixel structure 2 while light of other frequencies of color will be absorbed.

As shown in FIG. 3, the active element 32 is in the second state (i.e., the ON state) where the active element 32 applies a voltage to the electrode layer 35. As a result, the electrode layer 35 is charged with electric charges, and an electric field is generated between the electrode layer 35 and the reflective layer 41. Under the influence of the electric field, changes in physical characteristics occurs to the surface of the hydrophobic layer 37, causing the hydrophobic layer 37 to exhibit increasing affinity to the polar liquid layer 39 instead. Hence, when attracted by the hydrophobic layer 37, the polar liquid layer 39 moves towards the surface of the hydrophobic layer 37 and expels the non-polar liquid to a side of the grid 38. As a result, the adjustable light shielding layer 34 contracts to a side of the grid 38, thus allowing the light reflected by the reflective layer 41 to emit out directly through the transparent area 331 and the first substrate 31. Thus, the pixel structure presents a bright spot.

In the pixel structure 2, the black matrix of the opaque area 332 is sized to cover the active element 32, the grid 38 and the adjustable light shielding layer 34 that has contracted to a side of the pixel structure 2 when the active element 32 is in the second state. As a result, when the active element 32 is in the second state, i.e., when the pixel presents a bright spot, light that is projected outwards will not leak through the adjustable light shielding layer 34. By this configuration, the pixel of the bright spot state will not present the color of the adjustable light shielding layer 34, thus remarkably improving the contrast ratio of the pixel.

In summary, by disposing the black matrix of the light obstructing layer 33, the active element 32 and the adjustable light shielding layer 34 all on the first substrate 31 which serves as a light exiting surface, this invention eliminates the need to align the black matrix substrate with the active element substrate that would otherwise be needed in conventional electrowetting display devices, thus considerably decreasing the difficulty of the manufacturing process Furthermore, because the reflective layer 41 is disposed on the second substrate 40 that is opposite to the active element 32, there is no need to conduct a patterning process during the plating the reflective layer 41. Instead, aluminum can be plated integrally and rapidly on the second substrate 40 in a uniform way, thereby further simplifying the manufacturing process.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A pixel structure for use in a display device, the pixel structure utilizing a light entering from an ambient environment outside the display device as a light source, the pixel structure comprising:
   a first substrate;
   a light obstructing layer, disposed on the first substrate, having a transparent area and an opaque area, and further comprising a black matrix disposed in the opaque area of the light obstructing layer and adapted to obstruct the light;
   an active element, disposed on the opaque area of the light obstructing layer, and having a first state and a second state;
   an electrode layer, disposed between the active element and an adjustable light shielding layer and electronically connected to the active element;
   a hydrophobic layer, disposed on the electrode layer and between the light obstructing layer and the adjustable light shielding layer wherein the electrode layer is coextensive with the light obstructing layer, and the hydrophobic layer is coextensive with the electrode layer;
   a second substrate, disposed opposite to the first substrate; and
   a reflective layer, disposed on the second substrate and electrically connected to the active element, wherein the reflective layer reflects all the light entering from the ambient environment outside the display device, so that the reflected light emits outward from the first substrate through the transparent area;
   wherein the adjustable light shielding layer is disposed directly on the hydrophobic layer and when the active element is in the first state, a portion of the adjustable light shielding layer is positioned to cover the transparent area to shield the light from emitting out from the first substrate, and when the active element is in the second state, the portion of the adjustable light shielding layer is driven away from the transparent area to an area on the hydrophobic layer covering the opaque area, thereby uncovering the transparent area, so that the light is adapted to emit out from the transparent area and the first substrate.

2. The pixel structure as claimed in claim 1, wherein when the active element is in the first state, the electrode layer is not applied with a voltage, and
   when the active element is in the second state, the electrode layer is applied with a voltage to have a charge distribution.

3. The pixel structure as claimed in claim 2, wherein the electrode layer comprises an Indium Tin Oxide layer.

4. The pixel structure as claimed in claim 2, further comprising a passive layer disposed between the active element and the electrode layer and adapted to space the active element and the electrode layer apart.

5. The pixel structure as claimed in claim 2, wherein the hydrophobic layer is disposed between the electrode layer and the adjustable light shielding layer.

6. The pixel structure as claimed in claim 5, further comprising a grid disposed on the hydrophobic layer.

7. The pixel structure as claimed in claim 6, wherein when the active element is in the second state, the opaque area of the light obstructing layer at least covers the active element, the adjustable light shielding layer and the grid.

8. The pixel structure as claimed in claim 7, wherein the reflective layer comprises aluminum.

9. The pixel structure as claimed in claim 7, wherein the reflective layer comprises aluminum alloy.

10. The pixel structure as claimed in claim 7, further comprising a polar liquid layer disposed between the adjustable light shielding layer and the second substrate, wherein;
    when the active element is in the first state, the adjustable light shielding layer is adapted to cover the hydrophobic layer and separate the hydrophobic layer and the polar liquid layer apart, and
    when the active element is in the second state, the polar liquid layer is adapted to move toward the hydrophobic layer due to attraction of the hydrophobic layer and drive the adjustable light shielding layer to move toward the grid so that the light is adapted to emit outward from the first substrate through the transparent area.

11. The pixel structure as claimed in claim 10, wherein the polar liquid layer is water.

12. The pixel structure as claimed in claim 10, wherein the polar liquid layer is a mixture of water, alcohol and salt.

13. The pixel structure as claimed in claim 1, wherein the adjustable light shielding layer is nonpolar liquid.

14. The pixel structure as claimed in claim 13, wherein the nonpolar liquid is oil-based ink.

15. The pixel structure as claimed in claim 1, wherein the active element comprises at least one thin film transistor.

16. The pixel structure as claimed in claim 1, wherein the active element is disposed between the light obstructing layer and the adjustable light shielding layer.

17. A display device comprising a plurality of pixel structures as claimed in claim 1.

* * * * *